(12) United States Patent
Kimura et al.

(10) Patent No.: US 12,361,660 B2
(45) Date of Patent: Jul. 15, 2025

(54) INFORMATION PROCESSING APPARATUS, INFORMATION PROCESSING METHOD, AND PROGRAM

(71) Applicant: Sony Group Corporation, Tokyo (JP)

(72) Inventors: Jun Kimura, Kanagawa (JP); Tsuyoshi Ishikawa, Kanagawa (JP); Shinichi Kawano, Tokyo (JP); Ikuo Yamano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 212 days.

(21) Appl. No.: 18/022,407

(22) PCT Filed: Jul. 12, 2021

(86) PCT No.: PCT/JP2021/026142
§ 371 (c)(1),
(2) Date: Feb. 21, 2023

(87) PCT Pub. No.: WO2022/044581
PCT Pub. Date: Mar. 3, 2022

(65) Prior Publication Data
US 2023/0343052 A1    Oct. 26, 2023

(30) Foreign Application Priority Data
Aug. 31, 2020 (JP) .............................. 2020-145586

(51) Int. Cl.
*G06T 19/20* (2011.01)
*G06T 7/13* (2017.01)
(Continued)

(52) U.S. Cl.
CPC ............. *G06T 19/20* (2013.01); *G06T 7/13* (2017.01); *G06T 7/50* (2017.01); *G06T 7/62* (2017.01); *G06T 2219/2016* (2013.01)

(58) Field of Classification Search
CPC ...... A63F 13/213; A63F 13/52; A63F 13/577; A63F 13/533; A63F 13/25; G06T 19/006;
(Continued)

(56) References Cited

U.S. PATENT DOCUMENTS

2020/0129850 A1 * 4/2020 Ohashi .................... A63F 13/25
2020/0218349 A1 * 7/2020 Chu ........................ G06F 3/011

FOREIGN PATENT DOCUMENTS

WO    WO-2018034319 A1 *  2/2018  ............. G06F 3/012
WO    WO 2018/198910 A1    11/2018

OTHER PUBLICATIONS

Bergamasco, et al., A realistic approach for grasping and moving virtual objects, Proceedings of IEEE/RSJ International Conference on Intelligent Robots and Systems (IROS'94), DOI: 10.1109/IROS. 1994.407354, ISBN:0-7803-1933-8, Sep. 12-16, 1994 (Year: 1994).*

(Continued)

*Primary Examiner* — Kee M Tung
*Assistant Examiner* — Biao Chen
(74) *Attorney, Agent, or Firm* — Paratus Law Group, PLLC

(57) ABSTRACT

Provided are an information processing apparatus, an information processing method, and a program capable of more easily implementing interaction between a virtual object and a palm of a user in a natural expression. The information processing apparatus includes a controller that displays a virtual object on a display unit, in which the controller detects a planar area of a hand from a captured image obtained by capturing an image of a real space, the controller performs control to set a contact determination area for determining contact with the virtual object for the planar area of the hand having been detected, and the contact determination area includes at least one plane portion.

16 Claims, 14 Drawing Sheets

(51) Int. Cl.
*G06T 7/50* (2017.01)
*G06T 7/62* (2017.01)

(58) Field of Classification Search
CPC .. G06T 19/20; G06T 7/62; G06T 7/50; G06T 7/13; G06T 2219/2016; G06F 3/011; G06F 3/014; G06F 3/017
See application file for complete search history.

(56) References Cited

OTHER PUBLICATIONS

Nakashima, a machine translated English version of a foreign patent application (WO 2018034319 A1). (Year: 2018).*

* cited by examiner

FIG. 16
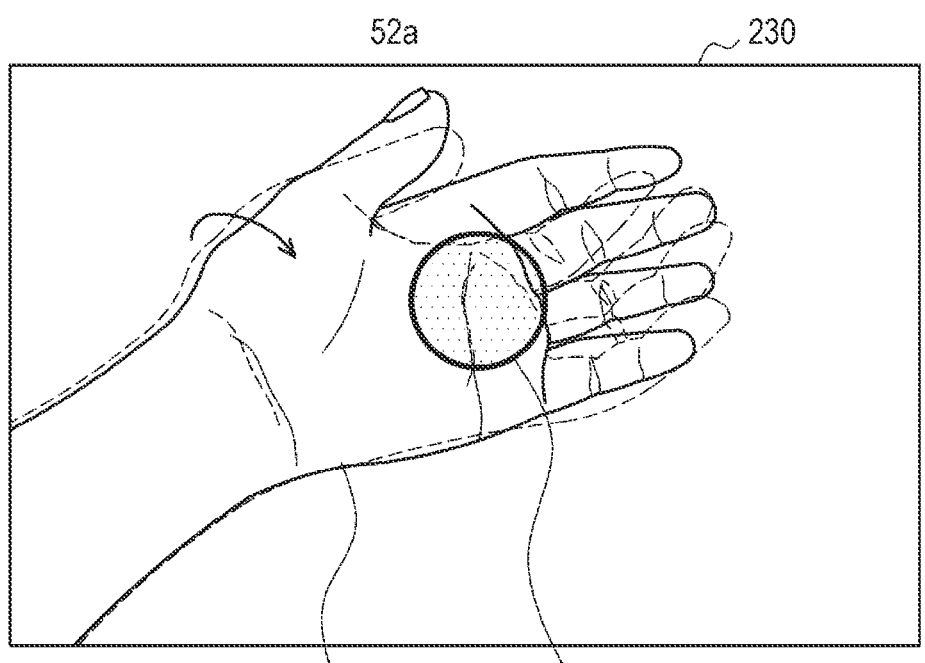
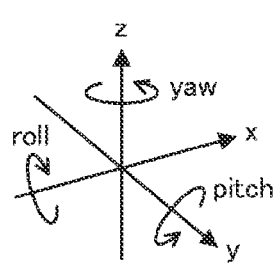

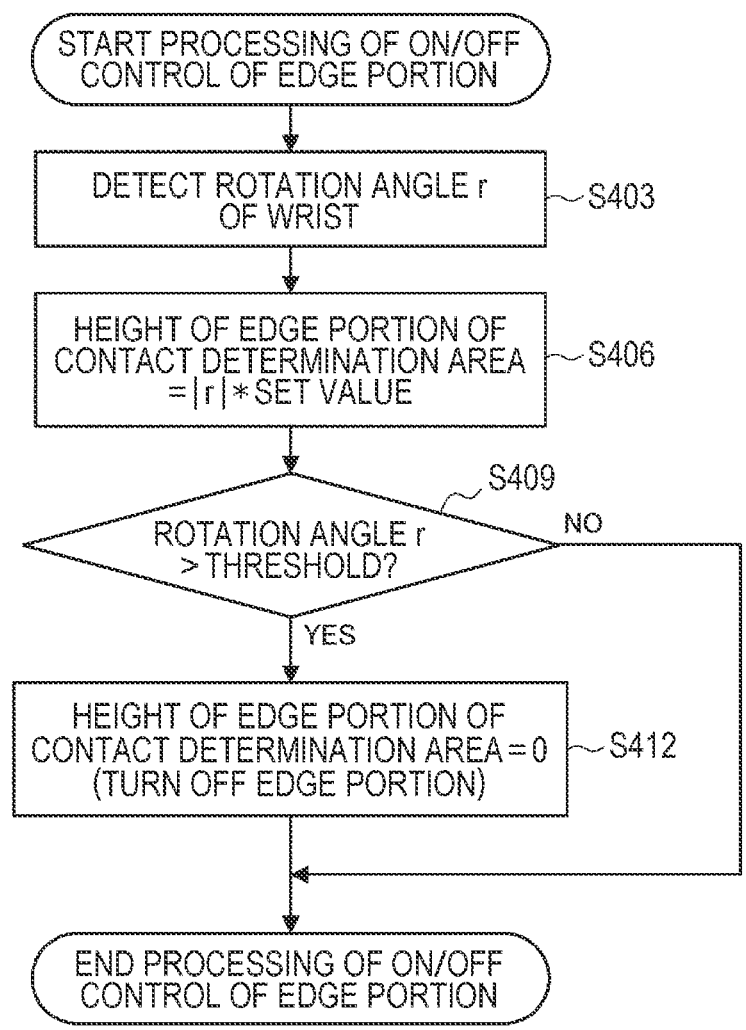

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2021/026142 (filed on Jul. 12, 2021) under 35 U.S.C. § 371, which claims priority to Japanese Patent Application No. 2020-145586 (filed on Aug. 31, 2020), which are all hereby incorporated by reference in their entirety.

TECHNICAL FIELD

The present disclosure relates to an information processing apparatus, an information processing method, and a program.

BACKGROUND ART

In recent years, various technologies for viewing a real space and a virtual space in a fusion have been developed. For example, an augmented reality (AR) technology has been developed as a technology for superimposing and displaying an image as information of a virtual space (referred to as a virtual object) on the real space in a state where the real space is directly visible to the eyes of a user. As display device that provides augmented reality, an optically transmissive head mounted display (hereinafter, referred to as HMD) can be exemplified.

In addition, a virtual reality (VR) technology has also been developed in which a user can view a virtual space in which 3D models and the like are disposed from an arbitrary viewpoint. The world of VR (video of virtual space) is provided by using, for example, a non-transmissive HMD that covers a field of view of the user with a display unit. By covering the field of view of the user and blocking the real space from the field of view by the display unit, a sense of immersion in the world of VR is enhanced.

In such a manner of providing AR and VR, a menu screen is displayed as one of virtual images, and selection by the user is accepted from the menu screen. For example, Patent Document 1 below discloses a technology related to acquiring information on a position of each fingertip of the user and determining contact between a virtual object such as a menu and a finger of the user.

CITATION LIST

Patent Document

Patent Document 1: International Publication No. 2018/198910

SUMMARY OF THE INVENTION

Problems to be Solved by the Invention

Here, implementation of a natural user interface (NUI) that naturally expresses operations such as rolling a virtual object on a palm or scooping a large number of small virtual objects with a hand takes a relatively high processing load and has been difficult to introduce.

Therefore, the present disclosure provides an information processing apparatus, an information processing method, and a program capable of more easily implementing interaction between a virtual object and a palm of a user in a natural expression.

Solutions to Problems

The present disclosure proposes an information processing apparatus including a controller that displays a virtual object on a display unit, in which the controller detects a planar area of a hand from a captured image obtained by capturing an image of a real space, the controller performs control to set a contact determination area for determining contact with the virtual object for the planar area of the hand having been detected, and the contact determination area includes at least one plane portion.

The present disclosure proposes an information processing method including displaying, by a processor, a virtual object on a display unit, and detecting, by the processor, a planar area of a hand from a captured image obtained by capturing an image of a real space, and performing, by the processor, control to set a contact determination area for determining contact with the virtual object for the planar area of the hand having been detected, in which the contact determination area includes at least one plane portion.

The present disclosure proposes a program that causes a computer to function as a controller that displays a virtual object on a display unit, in which the controller detects a planar area of a hand from a captured image obtained by capturing an image of a real space, the controller performs control to set a contact determination area for determining contact with the virtual object for the planar area of the hand having been detected, and the contact determination area includes at least one plane portion.

BRIEF DESCRIPTION OF DRAWINGS

FIG. 16 is a diagram for describing an angle of a wrist according to a third modification of the embodiment.

FIG. 17 is a flowchart illustrating an example of a flow of operation processing of ON/OFF control of the edge portion of the contact determination area according to a third modification of the embodiment.

MODE FOR CARRYING OUT THE INVENTION

Figure 1:
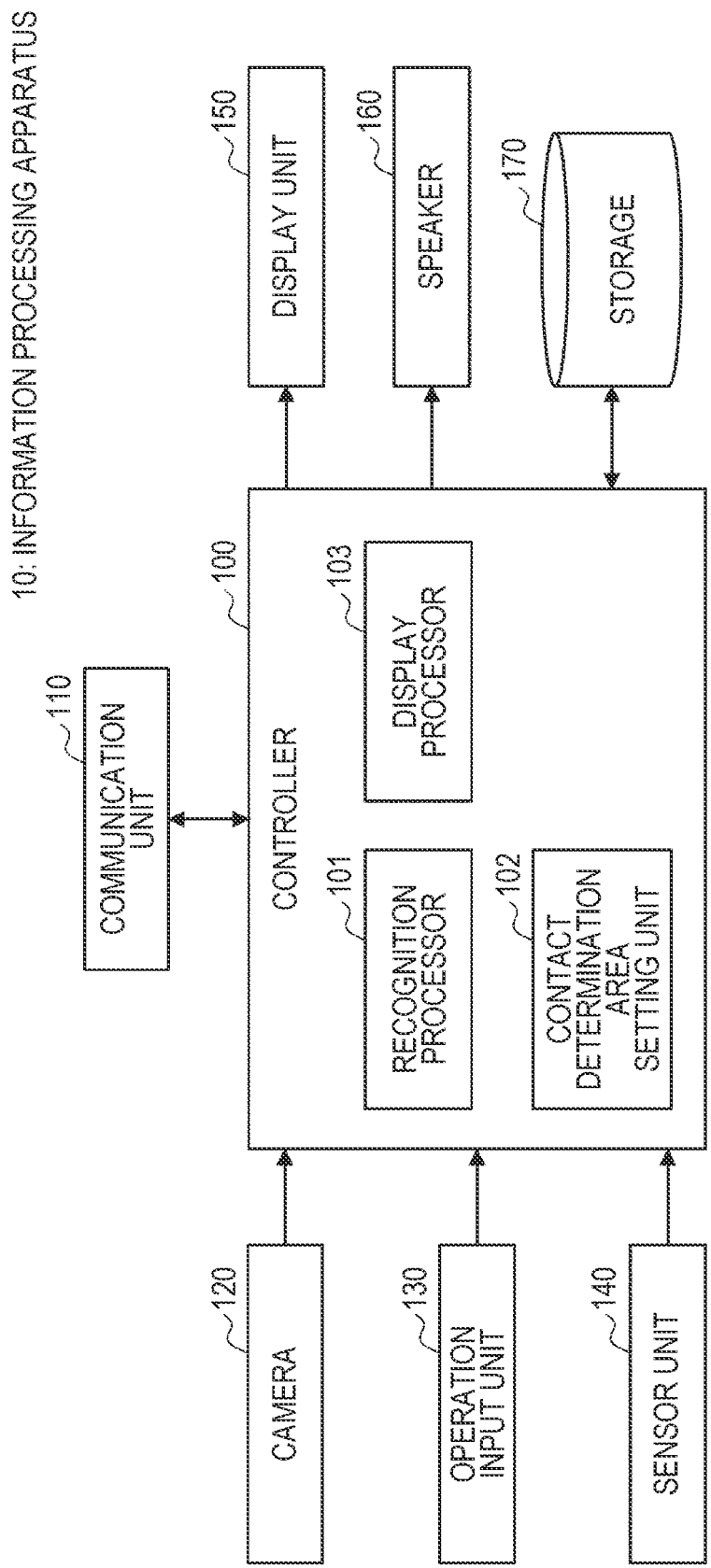
FIG. 1 is a block diagram illustrating an example of a configuration of an information processing apparatus according to one embodiment of the present disclosure.

Hereinafter, a preferred embodiment of the present disclosure will be described in detail with reference to the accompanying drawings. Note that, in the present specification and the drawings, components having substantially the same functional configuration are denoted by the same reference signs, and redundant description is omitted.

Furthermore, the description will be made in the following order.

1. Overview
2. Configuration example
3. Operation processing
4. Modifications
4-1. First modification
4-2. Second modification
4-3. Third modification
5. Additional notes
6. Summary 1. Overview As one embodiment of the present disclosure, a mechanism for more easily implementing interaction between a virtual object and a palm of a user in natural expression will be described.

The virtual object is an image presented to the sense of sight of the user as information of a virtual space. As an example to which the embodiment is applied, a case is assumed in which a user manually interacts with a virtual object in a world of augmented reality (AR) or virtual reality (VR). For example, in the case of AR, the user directly views a real space via a transmissive display, and the virtual object is displayed so as to be superimposed on the real space on the transmissive display. The user can perform operations such as placing the virtual object displayed on the transmissive display on a palm in a state where the user can directly see the user's own hand in the real space via the transmissive display. Furthermore, in the case of VR, the user wears a non-transmissive display that blocks light in the real space on the head, and an image of the virtual space from the viewpoint of the user is displayed on the non-transmissive display. In the virtual space, for example, a virtual hand (virtual object reflecting the shape of the hand in real time) corresponding to the movement of the hand of the user may be displayed. The movement of the hand of the user in the real space is detected by a sensor attached to the hand of the user or a camera capturing an image of the hand of the user, and is reflected in the virtual hand. The user can perform operations such as placing the virtual object on the palm of the virtual hand reflecting the movement of the hand of the user.

(Review of Problems)

Here, in order to achieve a natural user interface (NUI) that expresses a natural movement such as placing a virtual object on a palm, rolling the virtual object with the palm, or scooping up the virtual object, it is necessary to capture fine shapes of fingertips and perform a physical calculation. However, both the capturing and the physical calculation take a large processing load and are difficult to introduce. For example, the processing load of the physical calculation for more naturally expressing operations such as scooping water or scooping a plurality of small balls is large.

In addition, even if the physical calculation of a hand is strictly performed, it is difficult to hold the virtual object with the hand unless determination of touch of the virtual object, parameter setting of a weight, and the like are correctly performed. Conventionally, there have been adopted a rule base in which a virtual object is held by a predetermined command, the held virtual object is attracted to a hand so as not to be dropped, and the like, and measures such as an operation without directly touching the virtual object. However, in the method of attracting the virtual object and the method of operating the virtual object without directly touching the virtual object, a natural operation expressed by the virtual object, such as rolling the virtual object with the palm or scooping up water or a plurality of small balls, cannot be performed, and intuitive operationality cannot be obtained.

In addition, even if positions of hands and fingers can be accurately acquired, a position error between the real space and the virtual space can occur, and it is thus difficult to perform an operation of touching the virtual object.

Therefore, in one embodiment according to the present disclosure, interaction between a virtual object and a hand of a user is more easily implemented in a natural expression by setting a contact determination area for determining contact with the virtual object for a planar area of the hand. Note that, in the present specification, the contact includes collision. That is, in the contact determination area, collision of a virtual object can also be determined.

As a result, natural operations such as scooping the virtual object with the hand, placing the virtual object on the palm, and rolling the virtual object with the palm can be more easily performed. An easier method means that the processing load is not relatively large, as one example. Furthermore, the user can directly operate the virtual object with the user's hand, and the intuitive operationality can be provided.

Note that the information of the virtual space according to the embodiment can be presented by an information processing apparatus 10 according to the embodiment. The information processing apparatus 10 may be implemented by a head mounted display (HMD) mounted on the head of the user, or may be a terminal held and used by the user, such as a smartphone, a mobile phone terminal, or a tablet terminal, a wearable device mounted by the user, or the like.

For example, a transmissive HMD used in the case of AR may be an eyeglass device mounted on the head of the user. A transmissive display is provided on a lens of the eyeglass device. In addition, a non-transmissive HMD used in the case of VR is configured to be mounted on the head of the user to block the external world, and it is possible to increase a sense of virtual reality (sense of immersion in the virtual space) at the time of viewing. Furthermore, the HMD includes an image display unit for each of the left and right eyes, and can display different videos for the left and right eyes. A 3D image can be presented by displaying a parallax image for the left and right eyes.

In addition, it is also assumed that a video see-through display is used as another example of a display that implements AR. The video see-through display is a non-transmissive display, and may be implemented by, for example, being configured to be mounted on the head of the user and block light in the real space. The video see-through display displays a video of the real space in real time. The video of the real space can be acquired by a camera provided on the video see-through display mounted on the head of the user so as to capture an image in a direction of a line-of-sight of the user. On the video see-through display, the virtual object is superimposed and displayed on the video of the real space. The video see-through display may be switchable between a transmissive display (optical see-through display) and a non-transmissive display by providing a configuration for dynamically shielding light in the real space.

The outline of one embodiment of the present disclosure has been described above. Next, a specific configuration of the information processing apparatus 10 that achieves the embodiment will be described with reference to the drawings.

2. Configuration Example

FIG. 1 is a block diagram illustrating an example of the configuration of the information processing apparatus 10 according to the embodiment. As illustrated in FIG. 1, the information processing apparatus 10 includes a controller 100, a communication unit 110, a camera 120, an operation input unit 130, a sensor unit 140, a display unit 150, a speaker 160, and a storage 170. As one example, the information processing apparatus 10 according to the embodiment can be implemented by an eyeglass device (transmissive display) capable of presenting AR.

<2-1. Communication Unit 110>

The communication unit 110 is communicably connected to an external device by wire or wirelessly to transmit and receive data. For example, the communication unit 110 is connected to a network and transmits and receives data to and from a server on the network. For example, the communication unit 110 may receive data of the virtual object presented as the information of the virtual space from the server. Furthermore, the communication unit 110 is communicably connected to an external device or a network by, for example, a wired/wireless local area network (LAN), Wi-Fi (registered trademark), Bluetooth (registered trademark), a mobile communication network (long term evolution (LTE), third generation mobile communication system (3G), fourth generation mobile communication system (4G), and fifth generation mobile communication system (5G)), or the like.

<2-2. Camera 120>

The camera 120 is an imaging unit having a function of imaging the real space. A captured image of the real space captured by the camera 120 is used when the real space is recognized by a recognition processor 101 described later.

Figure 2:
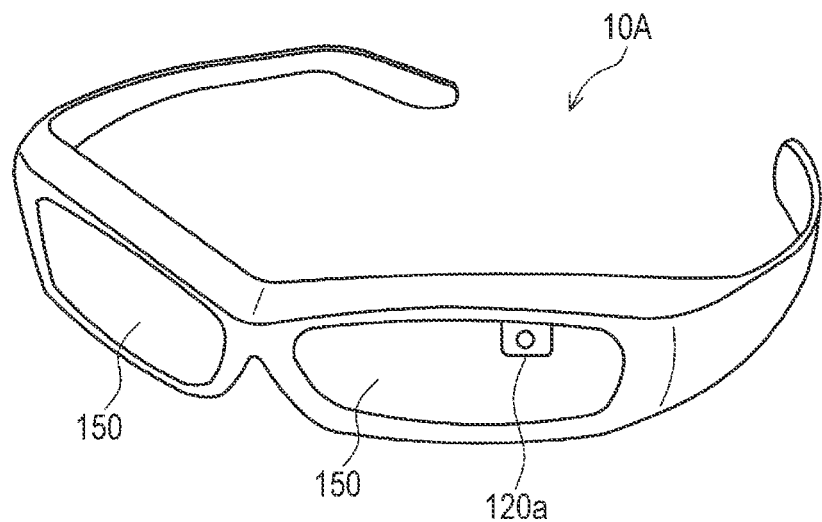
FIG. 2 is a diagram illustrating an example of appearance of an eyeglass device that implements the information processing apparatus according to the embodiment.

For example, in a case where the information processing apparatus 10 is implemented by an eyeglass device 10A as illustrated in FIG. 2, the camera 120 is implemented by a camera 120a (outward facing camera) provided to face the direction of the line-of-sight of the user. An angle of view of the camera 120a is desirably an angle of view including a field of view of the user. As a result, the recognition processor 101 described later can recognize the real space viewed by the user via the display unit 150 on the basis of the captured image captured by the camera 120a. The camera 120 may be singular or plural. Furthermore, the camera 120 may be configured as a so-called stereo camera.

Figure 3:
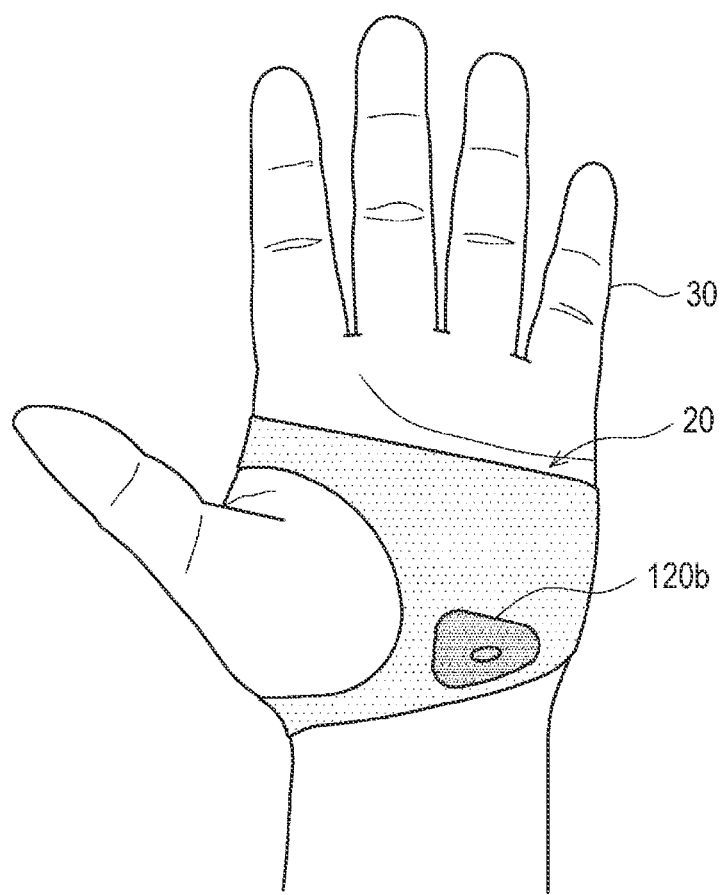
FIG. 3 is a diagram for describing a camera mounted on a hand according to the embodiment.
Figure 4:
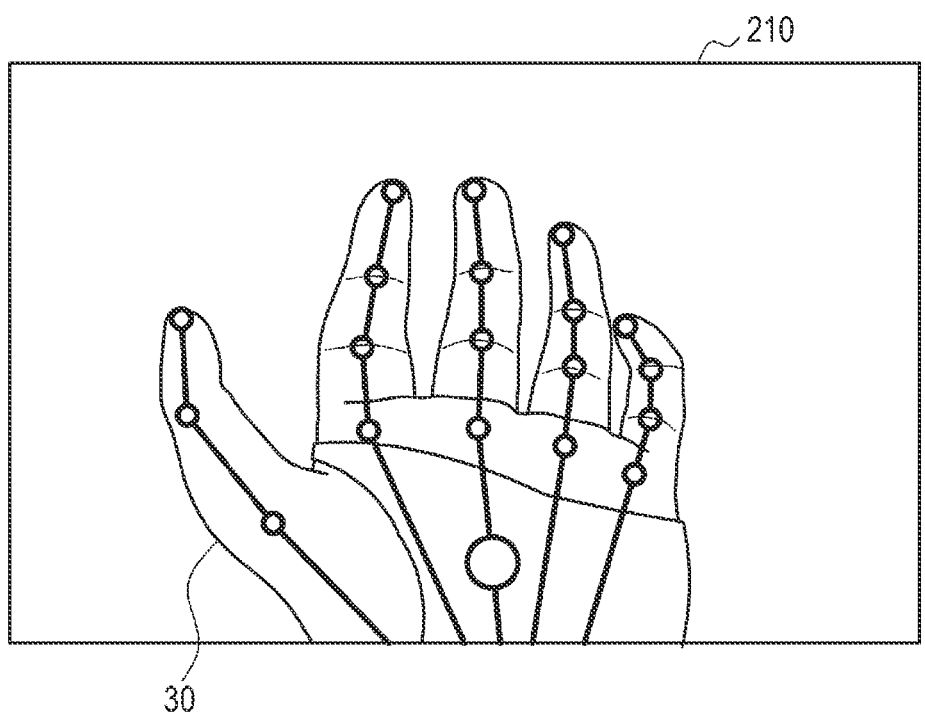
FIG. 4 is a diagram illustrating an example of a captured image acquired by a camera mounted on a hand according to the embodiment.

In addition, as another example of the camera 120, a camera 120b for recognizing the shape, movement, and the like of the hand of the user may be mounted on the hand of the user. FIG. 3 is a diagram for describing an example of the camera 120b mounted on the hand of the user. As illustrated in FIG. 3, for example, a wearable device 20 provided with the camera 120b that capturing an image of a direction of a finger of a hand on a palm side of the user is mounted on a hand 30 of the user. The camera 120b can capture a captured image 210 as illustrated in FIG. 4, for example. In the recognition processor 101 described later, recognition (for example, bone recognition or the like) for obtaining the shape and movement of the hand, the angle of the finger, or the like of the user can be performed on the basis of the captured image 210 captured by the camera 120b. The camera 120b is communicably connected to the information processing apparatus 10 by wire or wirelessly, and can transmit the captured image to the information processing apparatus 10.

<2-3. Operation Input Unit 130>

The operation input unit 130 has a function of receiving an operation from the user. The operation input unit 130 outputs information of the received operation to the controller 100. The operation input unit 130 may be implemented by, for example, an input device such as a touch panel or a button.

<2-4. Sensor Unit 140>

The sensor unit 140 has a function of sensing the real space including a position (user position), movement, and a surrounding situation of the information processing apparatus 10. The sensor unit 140 includes, for example, a position measurer, an acceleration sensor, an angular velocity sensor, a geomagnetic sensor, an infrared sensor, a distance measurement sensor (a sensor that measures a distance to an object existing in the real space), a biological sensor, a microphone, and the like.

In addition, the sensor unit 140 may include an inward facing camera that images the eyes of the user. For example, the direction of the line-of-sight of the user is detected by the inward facing camera.

The position measurer has a function of calculating an absolute or relative position of the information processing apparatus 10. For example, the position measurer may detect a current position on the basis of an acquired signal from the outside. Specifically, for example, a global navigation satellite system (GNSS) that receives radio waves from an artificial satellite and detects the current position where the information processing apparatus 10 is present may be used. Furthermore, in addition to GNSS, Wi-Fi (registered trademark), Bluetooth (registered trademark), transmission and reception with a mobile phone, a PHS, a smartphone, or the like, or a method of detecting a position by short-range communication or the like may be used. In addition, the position measurer may estimate information indicating a relative change on the basis of a detection result of the acceleration sensor, the angular velocity sensor, or the like.

The sensor unit 140 may be provided in the information processing apparatus 10 (for example, the eyeglass device 10A illustrated in FIG. 2) mounted on the head of the user, or may be further provided in the wearable device 20 mounted on the hand of the user. For example, a three-dimensional position of the hand of the user can be detected by an acceleration sensor, an angular velocity sensor, a geomagnetic sensor, or the like provided in the wearable device 20.

<2-5. Display Unit 150>

As one example, the display unit 150 is implemented by a transmissive display. The transmissive display is a display capable of directly delivering light in the real space to the eyes of the user. The user can directly visually recognize the real space via the transmissive display. The transmissive display may be, for example, an optical see-through display. The optical see-through display can adopt a known form including a half mirror type, a light guide plate type, a retina direct drawing type, and the like.

<2-6. Speaker 160>

The speaker 160 has a function of outputting sound. For example, the speaker 160 may be configured as a headphone, an earphone, or a bone conduction speaker.

<2-7. Storage 170>

The storage 170 is implemented by a read only memory (ROM) that stores programs, calculation parameters, and the like used for processing of the controller 100, and a random access memory (RAM) that temporarily stores parameters and the like that change appropriately.

<2-8. Controller 100>

The controller 100 functions as a calculation processing device and a control device, and controls the overall operation in the information processing apparatus 10 in accordance with various programs. The controller 100 is implemented by, for example, an electronic circuit such as a central processing unit (CPU) or a microprocessor. In addition, the controller 100 may include a read only memory (ROM) that stores programs, calculation parameters, and the like to be used, and a random access memory (RAM) that temporarily stores parameters and the like that change appropriately.

The controller 100 controls the display unit 150 and the speaker 160, and performs control to present information of the virtual space to the sense of sight and hearing of the user. The information of the virtual space may be stored in the storage 170 or may be received from an external device via the communication unit 110. The external device may be, for example, a server on the Internet, or may be a dedicated terminal, a smartphone, a tablet terminal, a PC, or the like disposed in the same space as the information processing apparatus 10.

Furthermore, the controller 100 performs control to change the information of the virtual space to be presented to the sense of sight and hearing of the user on the basis of the captured image of the surroundings captured by the camera 120, the information of the operation by the user input from the operation input unit 130, and various sensing data sensed by the sensor unit 140. For example, the controller 100 recognizes a change in a position (self position of the information processing apparatus 10 mounted on the user), posture, and the like of the user on the basis of the sensing data, and changes the display (position and posture) of the virtual object superimposed and displayed on the real space as the information of the virtual space. Furthermore, the controller 100 recognizes an object such as a hand of the user captured by the camera 120, and changes the display of the virtual object.

Specifically, the controller 100 according to the embodiment can also function as the recognition processor 101, a contact determination area setting unit 102, and a display processor 103.

(Recognition Processor 101)

The recognition processor 101 performs recognition processing of various data input to the controller 100. Specifically, the recognition processor 101 performs processing of recognizing the real space on the basis of the captured image obtained by capturing the real space by the camera 120. As the recognition of the real space, the recognition processor 101 recognizes each object appearing in the captured image, for example. An algorithm of the object recognition is not limited, but for example, a three-dimensional object recognition or a bone estimation algorithm may be used. Furthermore, the recognition processor 101 may acquire depth data from the camera 120 or the sensor unit 140 and use the depth data for the recognition processing of the real space.

The recognized object also includes the hand of the user. The recognition processor 101 can recognize the shape and movement of the hand of the user, an angle of a finger, or the like on the basis of the captured image 210 (see FIG. 4) captured by the camera 120b mounted on the hand of the user as described with reference to FIG. 3, for example. Furthermore, the recognition processor 101 can detect the position (three-dimensional position) of the hand of the user and a planar area corresponding to the palm of the hand of the user on the basis of various sensors provided in the camera 120a that captures the direction of the line-of-sight of the user and the wearable device 20 mounted on the hand of the user.

In addition, the recognition processor 101 can recognize the self position or posture of the information processing apparatus 10 (the head of the user on which the information processing apparatus 10 is mounted) on the basis of the sensing data or the like input from the sensor unit 140.

Furthermore, the recognition processor 101 can perform head tracking for following the movement of the head of the user, eye tracking for following the movement of the line-of-sight of the user, and position tracking for following the position and posture of the user on the basis of various data input to the controller 100. The position tracking generally includes an outside-in method using a sensor installed outside (environment side) of the information processing apparatus 10, an inside-out method using a sensor equipped in the information processing apparatus 10, and a hybrid method which is a combination of these methods.

(Contact Determination Area Setting Unit 102)

The contact determination area setting unit 102 sets a contact determination area for determining contact with the virtual object for the planar area of the hand. As described above, in the present specification, the contact includes collision. That is, in the contact determination area, collision of a virtual object can also be determined. The contact determination area includes at least one plane portion. In addition, the contact determination area may further include an edge portion located at an edge of the plane portion. The contact determination area setting unit 102 calculates a dimension of the plane portion on the basis of, for example, a dimension of the palm or a dimension of the virtual object as a target. In addition, the contact determination area setting unit 102 calculates the height of the edge portion on the basis of the shape of the hand (for example, the angle of at least one finger).

The set contact determination area is not displayed on the display unit 150 and is not visually recognized by the user. The contact determination area is set as a wall from which the virtual object does not protrude (does not pass through). The contact determination area may include, for example, a rectangular plane portion corresponding to the planar area of the palm of the user and an edge portion having a predetermined height. In the embodiment, by setting the contact determination area having a simple shape, it is possible to simplify an expression of the hand and reduce an amount of data used for the physical calculation. As a result, the interaction between the virtual object placed on the palm and the palm can be naturally expressed without capturing a fine shape of a finger and performing the physical calculation. For example, even in an operation of scooping water with a hand or scooping a plurality of small balls, the processing load of the physical calculation can be reduced by performing the physical calculation on the basis of the contact determination area set on the palm without capturing the fine shape of the hand (the positions of all the fingertips, the angles of all the fingers, and the like). A more detailed description of the contact determination area will be described later with reference to FIGS. 11 to 13.

(Display Processor 103)

The display processor 103 performs display processing of the virtual object superimposed on the real space on the display unit 150. The display processor 103 controls a display position and posture of the virtual object superimposed on the real space in accordance with the self position and posture of the user and the recognized position and posture of the object in the real space. Furthermore, the display processor 103 can control the movement of the virtual object superimposed on the real space in accordance with the contact determination area set on the palm of the user.

Although the configuration of the information processing apparatus 10 has been specifically described above, the configuration of the information processing apparatus 10 of the present disclosure is not limited to the example illustrated in FIG. 1. For example, the information processing apparatus 10 may be implemented by a plurality of apparatuses. Specifically, the information processing apparatus 10 may be implemented by a system configuration including a display device (including at least the display unit 150) implemented by an HMD or the like and an information processing terminal (including at least the controller 100) implemented by a smartphone, a tablet terminal, a PC, or the like. Furthermore, each processing performed by the controller 100 described above (each processing performed by the recognition processor 101, the contact determination area setting unit 102, and the and display processor 103) may be performed by an external device such as a server on a network, or may be implemented by a dedicated terminal, a smartphone, a tablet terminal, a PC, or the like disposed in the same space as the user.

3. Operation Processing

Next, operation processing of the information processing apparatus 10 according to the embodiment will be specifically described with reference to the drawings.

Figure 5:
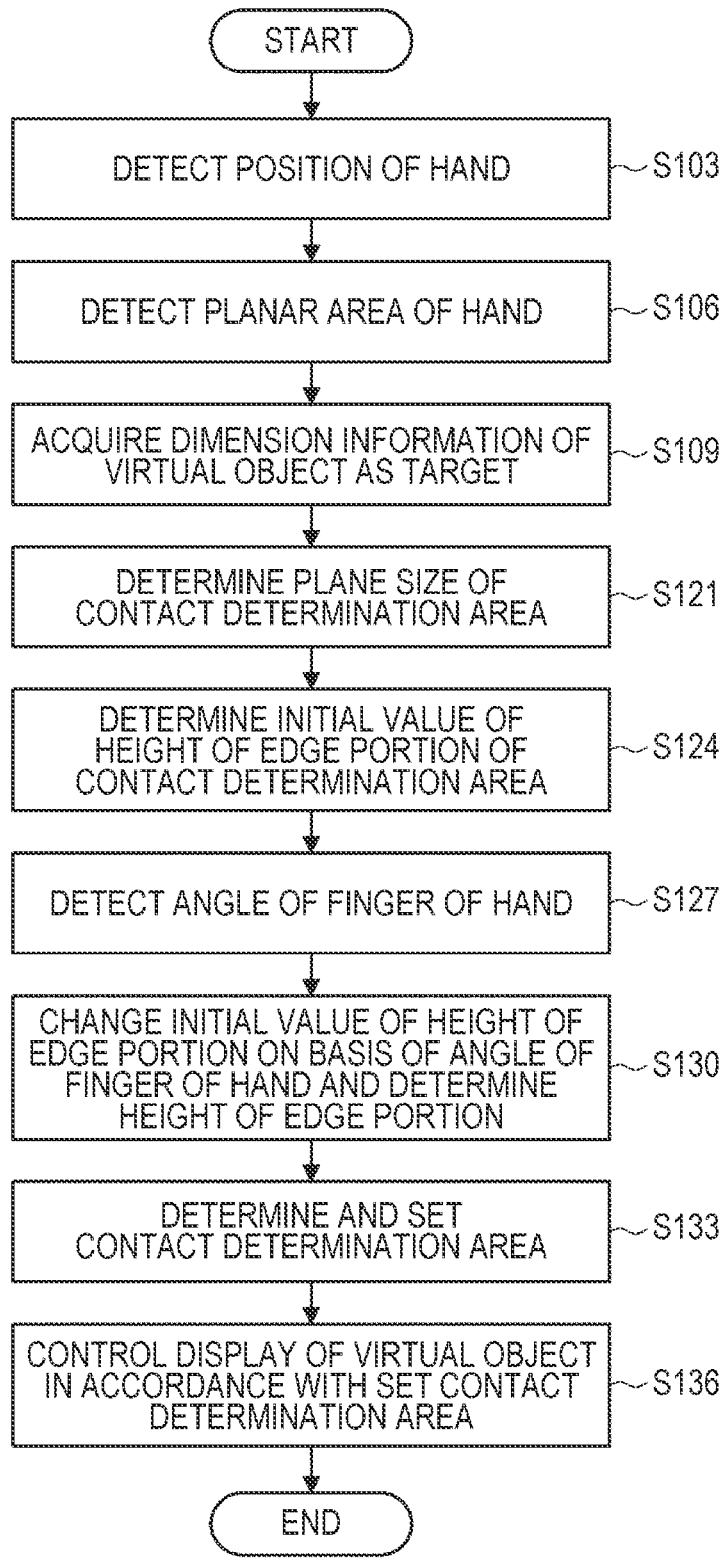
FIG. 5 is a flowchart illustrating an example of a flow of setting processing for a contact determination area performed by the information processing apparatus according to the embodiment.
Figure 6:
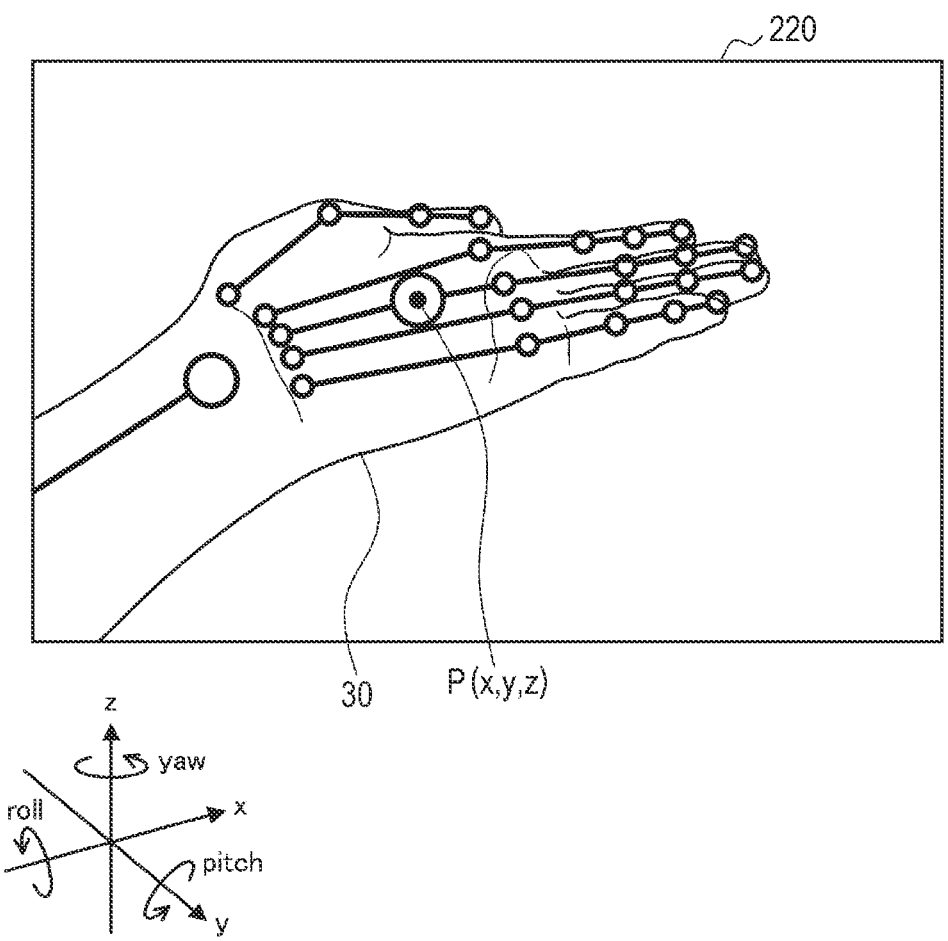
FIG. 6 is a diagram illustrating detection of a position of a hand based on bone estimation according to the embodiment.

FIG. 5 is a flowchart illustrating an example of a flow of setting processing for the contact determination area performed by the information processing apparatus 10 according to the embodiment. As illustrated in FIG. 5, first, the recognition processor 101 of the information processing apparatus 10 detects the position of the hand of the user on the basis of the captured image captured by the camera 120 and the sensing data detected by the sensor unit 140 (step S103). The position of the hand may be, for example, three-dimensional position coordinates (x, y, z) detected on the basis of at least one of the camera 120b provided in the wearable device 20 mounted on the hand, an inertial measurement unit (IMU) sensor (an example of the sensor unit 140), the camera 120a provided in the eyeglass device 10A mounted on the head, or an IMU sensor (an example of the sensor unit 140). Furthermore, the recognition processor 101 can also detect the posture of the hand of the user (yaw, roll, pitch). For example, as illustrated in FIG. 6, the recognition processor 101 performs bone estimation (a method of estimating a bone position, which is an example of posture estimation) by image analysis of a captured image 220 obtained by imaging the hand 30 of the user, and detects a central position of the hand as a position P (x, y, z) of the hand. In addition, the recognition processor 101 can also detect the posture (yaw, roll, pitch) at the position P (x, y, z) of the hand. Furthermore, the recognition processor 101 can also detect a position (three-dimensional position) of a joint of a finger of the hand on the basis of bone estimation, for example.

Figure 7:
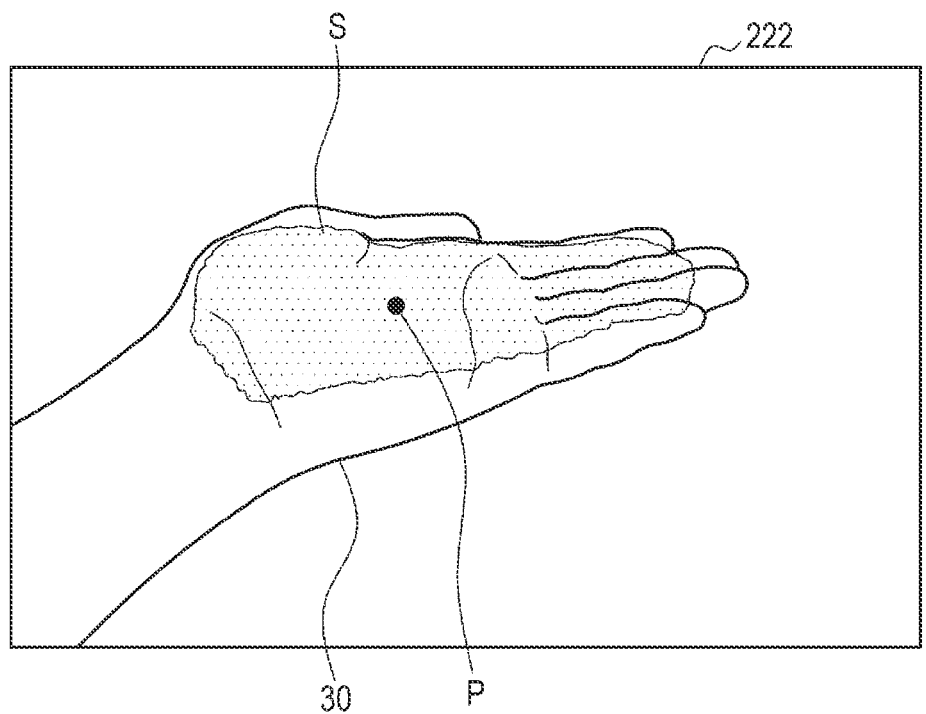
FIG. 7 is a diagram for describing detection of a planar area of a hand according to the embodiment.

Next, the recognition processor 101 detects a planar area S of the hand from the position P of the hand (step S106). FIG. 7 is a diagram for describing detection of the planar area of the hand. The recognition processor 101 detects the planar area S including the position P of the hand 30 of the user from an analysis result of a captured image 222 illustrated in FIG. 7. The captured image 222 may be the same as the captured image 220 illustrated in FIG. 6. The recognition processor 101 can detect the planar area by using depth information in addition to position information.

Next, the contact determination area setting unit 102 acquires dimension information of the virtual object as a target (step S109). The virtual object as a target is a virtual object that the hand 30 of the user has approached or touched. The contact determination area according to the embodiment can be set when the hand 30 of the user approaches or touches the virtual object. On the basis of the three-dimensional position of the hand 30 obtained by object recognition and the display positions (three-dimensional position coordinates) of one or more virtual objects superimposed and displayed on the real space, the recognition processor 101 can recognize that the hand 30 has approached the virtual object (a distance between the virtual object and the hand 30 is less than or equal to a predetermined value) or has touched the virtual object (the positions overlap). Furthermore, the contact determination area setting unit 102 may further determine the virtual object as a target from the line-of-sight of the user.

Figure 8:
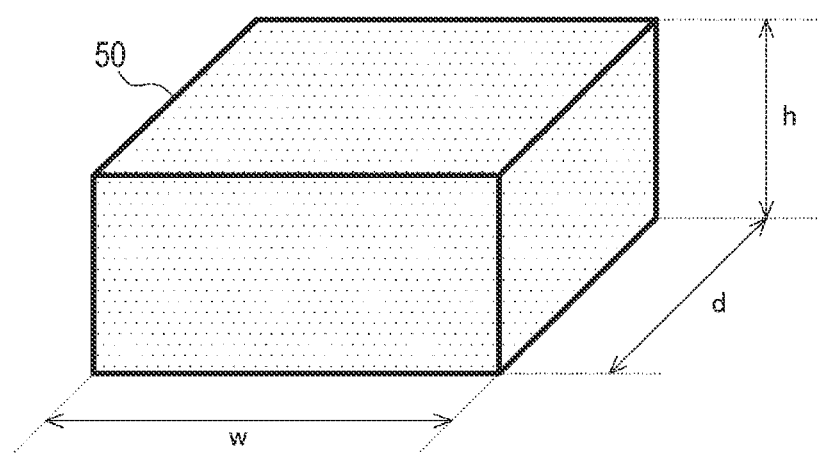
FIG. 8 is a diagram illustrating an example of dimension information of a 3D virtual object according to the embodiment.

Here, an example of the dimension information of the virtual object will be described with reference to FIG. 8. FIG. 8 is a diagram illustrating an example of dimension information of a 3D virtual object 50. As illustrated in FIG. 8, for example, the dimension information of the virtual object 50 includes numerical values of width, height, and depth. Note that a 3D virtual object is used as one example here, but the embodiment is not limited to the 3D virtual object, and a 2D virtual object may be used.

Figure 9:
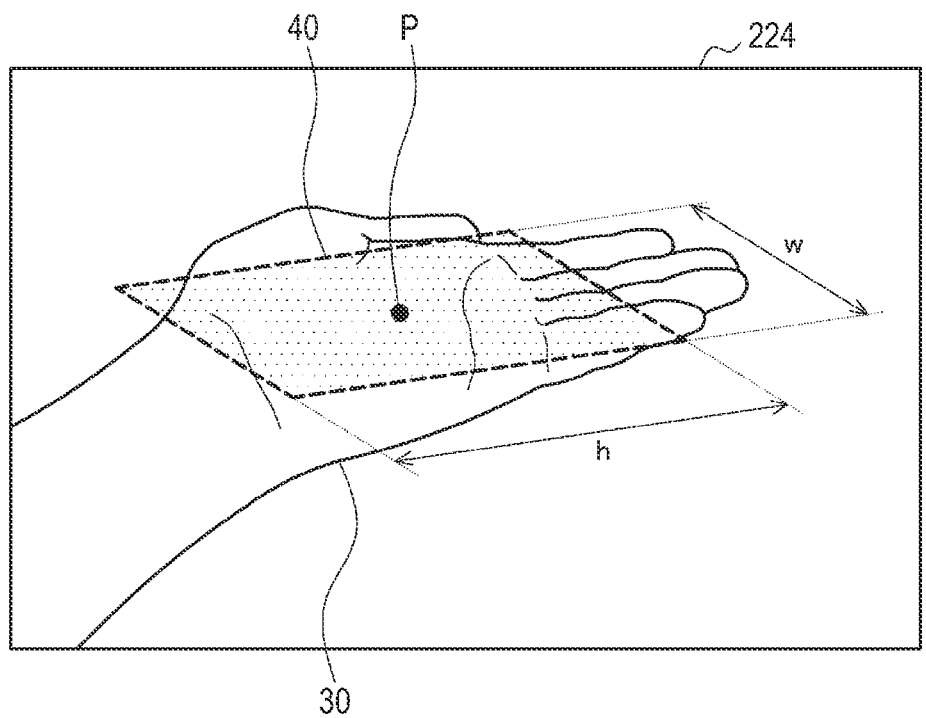
FIG. 9 is a diagram illustrating an example of a plane size of the contact determination area according to the embodiment.

Next, the contact determination area setting unit 102 determines a plane size of the contact determination area to be set for the palm of the hand 30 of the user (step S121). The plane size of the contact determination area is a dimension of the plane portion constituting the contact determination area. FIG. 9 is a diagram illustrating an example of the plane size of the contact determination area according to the embodiment. As illustrated in FIG. 9, the dimension of a plane portion 40 of the contact determination area set for the palm of the hand 30 of the user includes numerical values of width and height. The contact determination area setting unit 102 determines the dimension of the plane portion 40 on the basis of, for example, the dimension information of the hand 30 of the user and/or the dimension information of the virtual object as a target.

Figure 10:
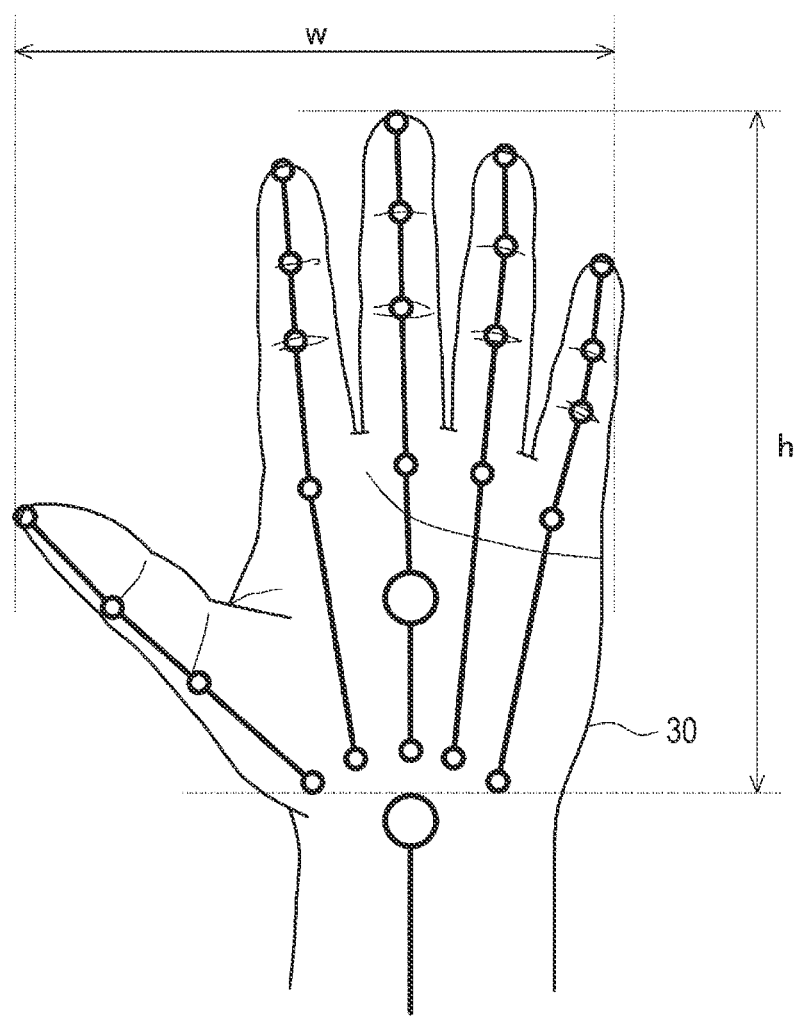
FIG. 10 is a diagram illustrating an example of dimension information of a hand of a user according to the embodiment.

The dimension information of the hand 30 of the user can be registered in the information processing apparatus 10 in advance at the time of initial setting or the like. FIG. 10 is a diagram illustrating an example of the dimension information of the hand 30 of the user. As illustrated in FIG. 10, for example, numerical values of width and height can be acquired as the size on the basis of a result of the bone estimation of the hand 30. For example, width is a length between the tip of the thumb and the tip of the little finger. In addition, height is, for example, a length from the tip of the middle finger to the wrist.

The contact determination area setting unit 102 may determine the dimension of the plane portion 40 so as to correspond to, for example, the dimension information of the hand 30 of the user or the dimension information of the virtual object as a target. For example, the contact determination area setting unit 102 may set the dimension of the plane portion 40 of the contact determination area to a dimension similar to width and depth (the dimension of the plane in contact with the palm) of the virtual object 50, or a dimension smaller by a predetermined ratio. In addition, the contact determination area setting unit 102 may set the dimension of the plane portion 40 of the contact determination area to a dimension similar to the dimension of the hand 30 of the user (width and height), or to a dimension smaller by a predetermined ratio.

Note that the contact determination area setting unit 102 may determine (calculate) the dimension of the plane portion 40 in advance on the basis of the dimension information of the hand 30 of the user. By performing the calculation in advance, it is possible to reduce a calculation load when the plane portion 40 of the contact determination area is set in real time. Furthermore, the contact determination area setting unit 102 may further perform processing of adjusting the dimension of the plane portion 40 of the contact determination area calculated in advance in accordance with the dimension of the virtual object as a target.

Figure 11:
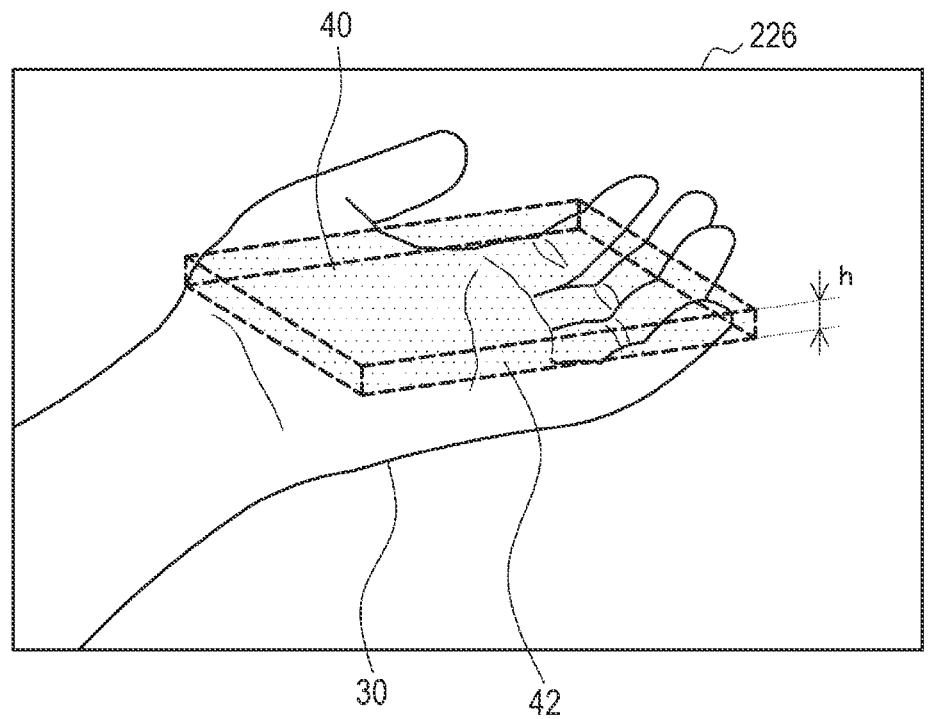
FIG. 11 is a diagram illustrating an example of an edge portion of the contact determination area according to the embodiment.

Next, the contact determination area setting unit 102 determines an initial value of the height of the edge portion of the contact determination area (step S124). The height of the edge portion of the contact determination area is the height of the edge portion provided at the edge of the plane portion of the contact determination area. Here, FIG. 11 is a diagram illustrating an example of an edge portion 42 of the contact determination area according to the embodiment. As illustrated in FIG. 11, the edge portion 42 is provided at all the edges of the plane portion 40 of the contact determination area so as to surround the plane portion 40. In the embodiment, first, the contact determination area setting unit 102 determines an initial value of a height (h) of the edge portion 42.

The initial value of the height (h) of the edge portion 42 may be determined on the basis of the size of the hand of the user, or may be determined on the basis of the dimension of the virtual object 50 as a target. Hereinafter, some examples of equations for calculating an initial value of the height the edge portion 42 will be described. In the following equations, a, β, and γ are arbitrary coefficients, respectively.

Initial value of height of edge portion 42=α×depth (d) of virtual object 50    (Equation 1)

or

=β×width (w) of virtual object 50    (Equation 2)

or

=γ×size (w, h) of hand of user    (Equation 3)

Next, the contact determination area setting unit 102 detects an angle of a finger of the hand 30 of the user (step S127). The contact determination area setting unit 102 detects an angle of a predetermined joint of any one or two or more fingers on the basis of the result of bone estimation of the finger of the hand recognized by the recognition processor 101. When a person scoops something with a hand or places something on the palm, it is assumed that the person slightly bends the fingers with the palm facing upward and makes the hand form like a bowl or a tray (tray). Therefore, in the embodiment, the height of the edge portion located at the edge (periphery) of the plane portion 40 of the contact determination area is calculated on the basis of an angle of a predetermined joint of a finger.

Figure 12:
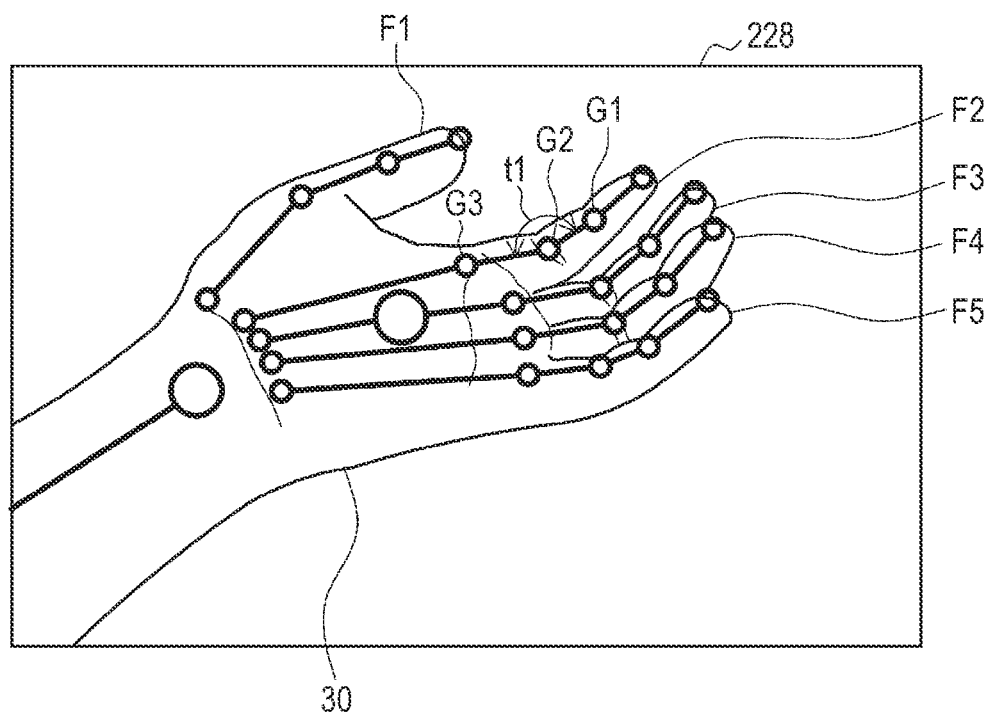
FIG. 12 is a diagram for describing detection of an angle of a finger according to the embodiment.

The angle of any finger may be detected. For example, since the thumb, the index finger, and the middle finger are generally important fingers for mainly operating an object, any finger may be designated from among these three fingers. In addition, the "angle of a predetermined joint of a finger" may be, for example, the angle of the second joint. Here, the detection of the angle of a finger will be described with reference to FIG. 12. As illustrated in FIG. 12, for example, on the basis of the result of the bone estimation obtained by analyzing a captured image 228, the contact determination area setting unit 102 detects an angle t1 of a second joint G2 of an index finger F2 among fingers (F1 to F5). Here, the angle t1 of the second joint G2 is detected as one example, but the embodiment is not limited to the angle t1. The angles of the first joint G1 and the third joint G3 may be detected, or all the angles of the first to third joints may be detected. In addition, here, the angle of the index finger F2 is detected as one example, but the embodiment is not limited to this angle. The angle of the thumb F1, the middle finger F3, the ring finger F4, or the little finger F5 may be detected.

Next, the contact determination area setting unit 102 changes the initial value of the height of the edge portion on the basis of the detected angle of the finger of the hand, and determines the height of the edge portion (step S130). It is therefore possible to adjust the height from the initial value of the height in accordance with a change in the angle of the finger. An example of an equation for calculating the final height of the edge portion 42 will be described below. In Equation 4 below, m is an arbitrary value. The calculation result may be returned at 1.0 to 0.0.

Final height of edge portion 42=(angle t1 of finger)× m×initial value of height of edge portion 42    (Equation 4)

Next, the contact determination area setting unit 102 determines the contact determination area on the basis of the size of the plane portion 40 and the final height of the edge portion 42 of the contact determination area calculated as described above, and sets the contact determination area on the palm of the hand of the user (the portion detected as the planar area) (step S133). Specifically, the contact determination area setting unit 102 sets the contact determination area including the plane portion 40 and the edge portion 42 as illustrated in FIG. 11 on the palm. The plane portion 40 is set on the planar area of the hand. Note that the contact determination area is not displayed on the display unit 150 and is not visually recognized by the user in the embodiment.

Figure 13:
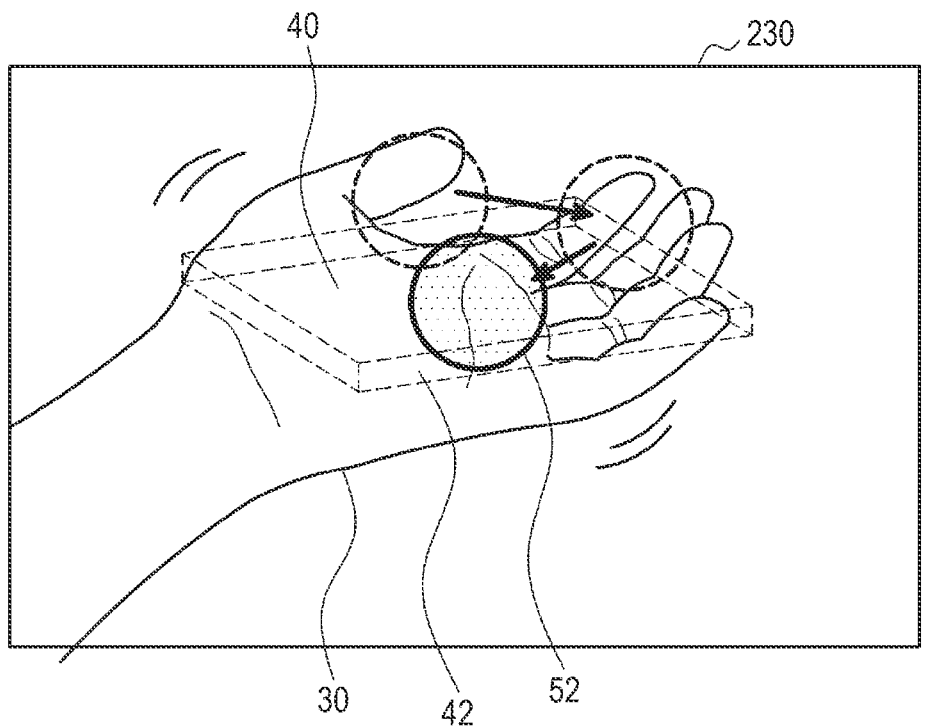
FIG. 13 is a diagram for describing display control of a virtual object in a case where the contact determination area according to the embodiment is set.

Then, the display processor 103 performs a physical calculation of the virtual object located on the palm of the hand on the basis of the set contact determination area, and controls the display of the virtual object (step S136). Here, FIG. 13 is a diagram for describing display control of the virtual object 52 in a case where the contact determination area according to the embodiment is set. As illustrated in FIG. 13, for example, when the virtual object 52 is rolled on the palm of the hand 30 of the user, the display processor 103 determines the contact (including collision) between the contact determination area (the plane portion 40 and the edge portion 42) set on the palm of the hand and the virtual object 52, and controls the virtual object 52 not to protrude from the contact determination area. As a result, by simplifying the expression of the hand by setting the contact determination area without capturing a fine shape of a finger and performing the physical calculation, the processing load of the physical calculation for calculating the interaction between the virtual object and the hand is reduced, and a natural expression can be achieved. The contact determination area setting unit 102 may change the height of the edge portion as needed on the basis of the continuously detected angle (change in the angle) of the finger.

The setting processing for the contact determination area according to the embodiment has been described above. Note that the operation process illustrated in FIG. 5 is an example, and the present disclosure is not limited to the example illustrated in FIG. 5. For example, the present disclosure is not limited to the order of the steps illustrated in FIG. 5. At least one of the steps may be processed in parallel, or may be processed in a reverse order. In addition, all the processing illustrated in FIG. 5 is not required to be executed. For example, the processing shown in step S109 may be skipped, or may be performed in parallel with S103 or S106. In addition, all the processing illustrated in FIG. 5 is not required to be performed by a single apparatus. For example, in the above description, it has been assumed that all the processing illustrated in FIG. 5 is performed by the information processing apparatus 10, but the present disclosure is not limited to this configuration. For example, at least a part of the processing illustrated in FIG. 5 may be performed by an external device.

Furthermore, in the embodiment, it has been described that the left hand is sensed and the contact determination area is set on the left hand as an example, but the embodiment is not limited to this configuration. It is of course possible to sense the right hand and set the contact determination area on the right hand.

4. Modifications

Next, a modification for the setting processing of the contact determination area according to the embodiment will be described.

<4-1. First Modification>

Figure 14:
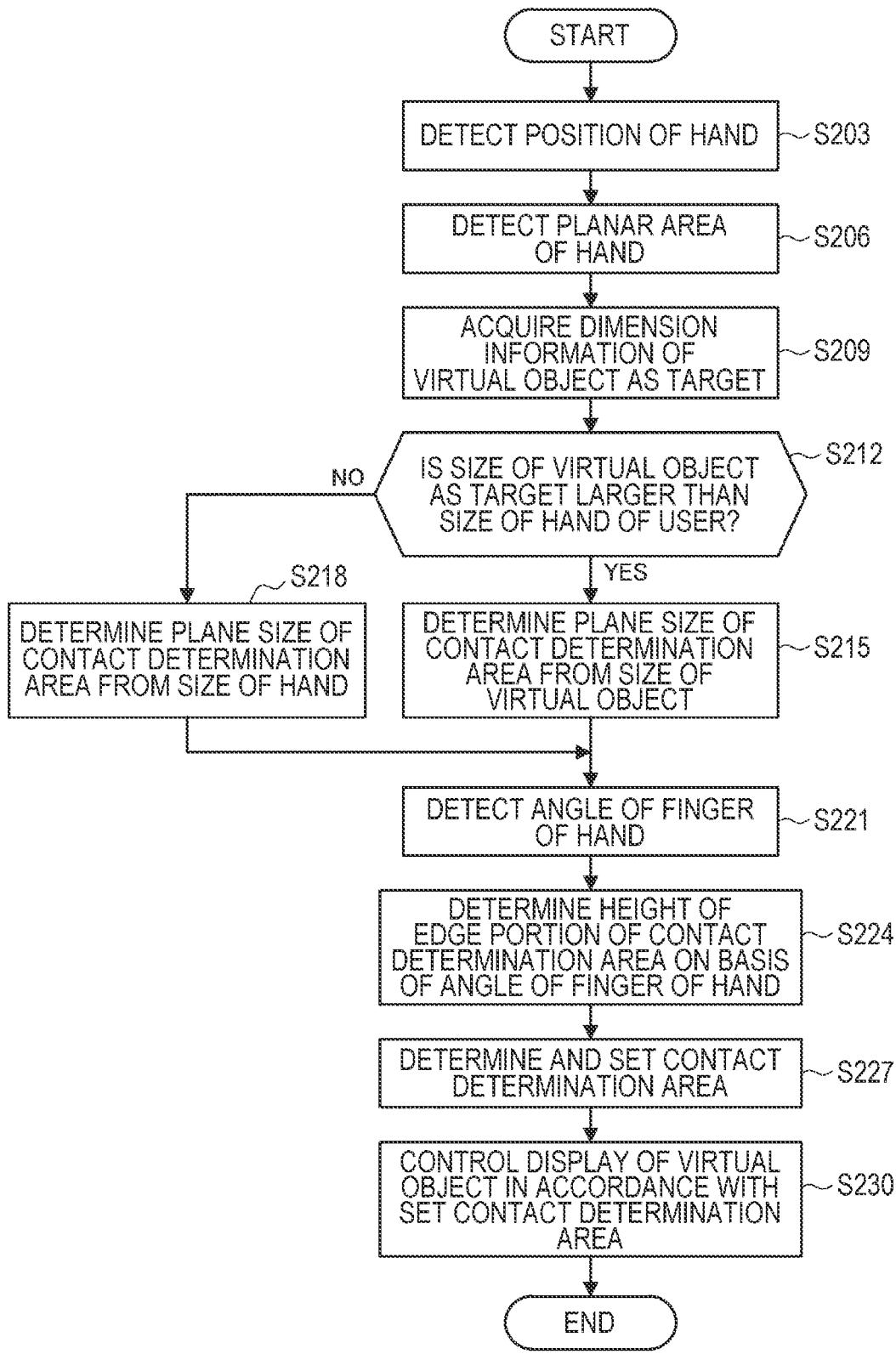
FIG. 14 is a flowchart illustrating an example of a flow in a first modification of the setting processing for the contact determination area performed by the information processing apparatus according to the embodiment.

FIG. 14 is a flowchart illustrating an example of a flow in a first modification of the setting processing for the contact determination area performed by the information processing apparatus 10 according to the embodiment.

First, in steps S203 to S209 illustrated in FIG. 14, processing similar to the processing illustrated in steps S103 to S109 according to the embodiment described above with reference to FIG. 5 is performed.

Next, the contact determination area setting unit 102 performs processing of determining the plane size (the dimension of the plane portion) of the contact determination area on the basis of the size of the virtual object as a target and the size of the hand (steps S212 to S215). Specifically, in a case where the size (width and depth) of the virtual object is larger than the size (width and height) of the hand (Yes in step S212), the contact determination area setting unit 102 determines the size (width and height) of the plane portion of the contact determination area by Equation 1 below on the basis of the size of the virtual object (step S215). In Equation 5 below, j is an arbitrary coefficient.

$$\text{Size } (w, h) \text{ of plane portion of contact determination area} = \text{size } (w, d) \text{ of virtual object} \times j \quad \text{(Equation 5)}$$

In a case where the size of the virtual object as a target to be placed on the palm is larger than the size of the palm, it is possible to more reliably place the virtual object on the palm by determining the size of the plane portion of the contact determination area in accordance with the size of the virtual object.

On the other hand, in a case where the size (width and depth) of the virtual object is smaller than the size (width and height) of the hand (No in step S212), the contact determination area setting unit 102 determines the size (width and height) of the plane portion of the contact determination area by Equation 2 below (step S218). In Equation 6 below, k is an arbitrary coefficient.

$$\text{Size } (w, h) \text{ of plane portion of contact determination area} = \text{size } (w, h) \text{ of hand} \times k \quad \text{(Equation 6)}$$

Next, the contact determination area setting unit 102 detects an angle of a finger of the hand of the user (step S221). In the detection of an angle of a finger of the hand, an angle of a predetermined joint of any one or two or more fingers is detected on the basis of the result of bone estimation of the finger of the hand recognized by the recognition processor 101 in a similar manner to step S127 described above. As one example, the contact determination area setting unit 102 may detect the angle t1 of the second joint of the index finger.

Next, the contact determination area setting unit 102 determines the height of the edge portion of the contact determination area on the basis of the detected angle of the finger of the hand (step S224). The height of the edge portion of the contact determination area is obtained by, for example, the following equation. In Equation 7 below, H is a set value set in advance.

$$\text{Height of edge portion of contact determination area} = \text{angle } t \text{ of finger} \times H \quad \text{(Equation 7)}$$

Note that the contact determination area setting unit 102 may detect angles of a plurality of fingers and calculate the height of the edge portion of the contact determination area on the basis of a sum of all the angles. In addition, the contact determination area setting unit 102 may detect the angles of the plurality of fingers, calculate the height of the edge portion of the contact determination area by the equation described above for each detected angle of the fingers, and determine an average value of the calculated heights of the respective edge portions as the final height of the edge portion of the contact determination area.

Next, the contact determination area setting unit 102 determines the contact determination area on the basis of the size of the plane portion and the height of the edge portion of the contact determination area calculated as described above, and sets the contact determination area on the palm of the hand of the user (the portion detected as the planar area) (step S227). Such setting is similar to step S133 described above.

Then, the display processor 103 performs a physical calculation of the virtual object located on the palm of the hand on the basis of the set contact determination area, and controls the display of the virtual object (step S230). Such setting is similar to step S136 described above.

<4-2. Second Modification>

It is assumed that a finger of a human hand is bent constantly, for example, when no force is applied in a natural state other than when the finger is intentionally bent. Therefore, in the modification, even when the user wants to separate the virtual object from the hand, the interaction can be performed more naturally.

Specifically, the modification controls generation of the edge portion of the contact determination area on the basis of a gesture command of the hand. Hereinafter, a specific description will be given with reference to FIG. 15.

Figure 15:
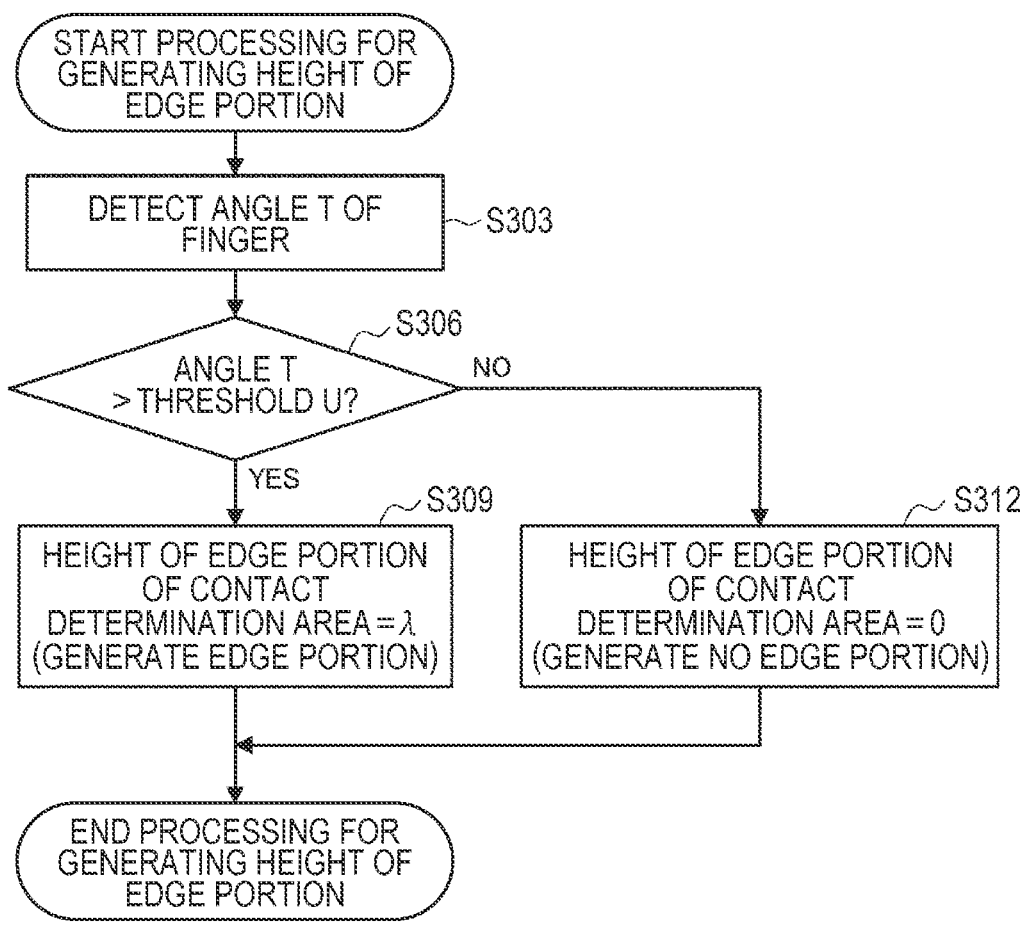
FIG. 15 is a flowchart illustrating an example of a flow of processing of generating a height of an edge portion according to a second modification of the embodiment.

FIG. 15 is a flowchart illustrating an example of a flow of processing for generating a height of an edge portion according to the modification. The plane size of the contact determination area is determined in a similar manner to the embodiment described above with reference to FIG. 5 and the first modification described above with reference to FIG. 14.

As illustrated in FIG. 15, first, the contact determination area setting unit 102 detects an angle T of a finger (step S303). The angle T of the finger may be performed on the basis of the result of bone estimation as described with reference to FIG. 12. The angle T of the finger may be an angle of any one or two or more joints of fingers. In addition, the "angle of a joint of a finger" may be, for example, the angle of the second joint. As one example, the angle of the first joint of the thumb and the angle of the second joint of the index finger may be detected. In this case, the angle T of the finger may be a total value of the detected angles.

Next, the contact determination area setting unit 102 determines whether or not the angle T exceeds a threshold U (step S306). The threshold U indicates an angle for performing gesture determination of generation of an edge portion. Such an angle may be an angle of a joint of a finger in a natural state in which force of the hand is released.

Next, in a case where the angle T exceeds the threshold U (Yes in step S306), the contact determination area setting unit 102 determines the state to be a gesture command for generation of an edge portion (the user intentionally bends the finger), and determines the height of the edge portion of the contact determination area to an arbitrary value (λ) (step S309). That is, the contact determination area setting unit 102 generates an edge portion of the contact determination area. The arbitrary value (λ) may be calculated by Equation 7 described above on the basis of the detected angle of the finger of the hand.

On the other hand, in a case where the angle T does not exceed the threshold U (No in step S306), the contact determination area setting unit 102 determines the state not to be a gesture command for generation of an edge portion (the user keeps the finger in a natural state), and determines the height of the edge portion of the contact determination area to 0 (step 3312). That is, the contact determination area setting unit 102 does not generate an edge portion of the contact determination area.

The control of generating and not generating and edge portion of the contact determination area based on the angle of the finger of the hand has been described above. Note that, in either case, the plane portion of the contact determination area can be set on the palm. By setting the simplified contact determination area (only the plane portion) corresponding to the palm, it is possible to reduce a physical calculation performed when, for example, a virtual object is pressed or placed on the hand with the fingers extended and the hand spread.

<4-3. Third Modification>

In a case where the virtual object is placed on the hand, the virtual object is rolled with the palm, or the virtual object is moved in a state of being placed on the hand, the operation is facilitated by presence of an edge portion of the contact determination area, but in a case where the virtual object placed on the hand is to be released from the hand, absence of an edge portion is preferable for the operation. Therefore, as one example, the modification enables further improved operability of the virtual object by controlling ON/OFF of the edge portion of the contact determination area on the basis of the angle of the wrist.

The angle of the wrist will be described with reference to FIG. 16. Normally, in a case where the virtual object placed on the hand is to be dropped from the hand to the floor, it is assumed that the palm of the hand facing horizontally upward is inclined inward. In the embodiment, as illustrated in FIG. 16, the angle of the wrist is assumed to be a rotation angle (roll angle) of an x axis in a case where a longitudinal direction of the palm is the x axis. The angle of the wrist can be detected by a captured image captured by the camera 120 or an inertial measurement unit (IMU) provided on the wrist. For example, the roll angle is detected assuming a case where the palm faces upward in a horizontal state as 0°, and in a case where the detected roll angle exceeds a threshold, the contact determination area setting unit 102 performs control to turn off the edge portion. Thus, the user can perform an operation such as naturally dropping the virtual object 52 placed on the palm on the floor by inclining the hand.

Hereinafter, operation processing according to the modification will be specifically described with reference to FIG. 17. FIG. 17 is a flowchart illustrating an example of a flow of operation processing of ON/OFF control of the edge portion of the contact determination area according to a third modification. Note that the plane size of the contact determination area and the height of the edge portion can be determined in a similar manner to the embodiment described above with reference to FIG. 5, the first modification described above with reference to FIG. 14, or the second modification described above with reference to FIG. 15. The ON/OFF control of the edge portion illustrated in FIG. 17 can also be said to be processing for adjusting the height of the edge portion performed on the basis of the angle of the wrist after the plane size of the contact determination area and the height of the edge portion are determined and the contact determination area is set on the palm of the user.

As illustrated in FIG. 17, first, the information processing apparatus 10 detects a rotation angle r of the wrist (step S403). As described with reference to FIG. 16, the rotation angle r of the wrist is, for example, the roll angle of the x axis in a case where the longitudinal direction of the palm is the x axis. Note that, here, the angle is expressed as the "angle of the wrist" as one example, but can also be referred to as an inclination of the planar area of the hand or an inclination of the plane portion of the contact determination area.

Next, the contact determination area setting unit 102 calculates the height of the edge portion of the contact determination area on the basis of the detected rotation angle r of the wrist (step S406). The height of the edge portion of the contact determination area is obtained by calculation of, for example, Equation 8 below.

Height of edge portion of contact determination area=$|r|$×set value (Equation 8)

In Equation 8 described above, the set value is a value defined in advance. As a result, the information processing apparatus 10 can appropriately adjust the height of the edge portion of the contact determination area set on the palm in accordance with inclination of the wrist. Specifically, the information processing apparatus 10 performs control to set the height of the edge portion to be lower as the inclination of the wrist is larger. The contact determination area setting unit 102 can change the height of the edge portion as needed on the basis of the continuously detected angle (change in the angle) of the wrist.

Next, the contact determination area setting unit 102 determines whether or not the rotation angle r of the wrist exceeds a threshold (step S409). In a case where the rotation angle r of the wrist exceeds the threshold (Yes in step S409), the contact determination area setting unit 102 sets the height of the edge portion of the contact determination area to 0 (step S412). That is, in a case where the rotation angle r of the wrist exceeds the threshold, the contact determination area setting unit 102 can perform an operation such as dropping the virtual object placed on the palm on the floor by turning off the edge portion of the contact determination area (not generating an edge portion).

5. Additional Notes

The embodiment and the modifications of the present disclosure have been described above.

Furthermore, the embodiment has been described above assuming augmented reality (AR) as one example, but the present disclosure is not limited to AR, and can be applied to virtual reality (VR) or mixed reality (MR).

In addition, the information processing apparatus 10 may be implemented by a transmissive or non-transmissive head mounted display (HMD) mounted on the head, may be a mobile terminal held by the user such as a smartphone or a tablet terminal, or may be various wearable devices mounted on the body of the user.

Furthermore, the shape of the plane portion of the contact determination area is not limited to a rectangle (the height h with respect to the longitudinal direction of the palm is smaller than the width w corresponding to the short direction of the palm) as illustrated in FIG. 9, and may be a square, an ellipse, or the like.

In addition, it has been described above in the embodiment that, in the calculation of the height of the edge portion of the contact determination area, the angle of the finger is taken as one example of the shape of the hand, and the height of the edge portion of the contact determination area is calculated on the basis of the angle of the finger. However, the present disclosure is not limited to this calculation. For example, the contact determination area setting unit 102 may calculate the height of the edge portion of the contact determination area on the basis of a position of a finger. Specifically, for example, the contact determination area setting unit 102 calculates the height of the edge portion on the basis of a distance between the second joint of the index finger and the position of the head (fingertip) of the index finger. The contact determination area setting unit 102 may perform control to set the edge portion to be lower as the distance is longer (farther) and the hand is open, and may perform control to set the edge portion to be higher as the distance is shorter (closer) and the hand is closed. Furthermore, the contact determination area setting unit 102 may calculate the height of the edge portion of the contact determination area on the basis of, for example, a distance between the position of the head of the thumb and the position of the head of the middle finger.

In addition, the contact determination area setting unit 102 may determine the dimension of the plane portion of the contact determination area in accordance with the shape of the hand. For example, the contact determination area setting unit 102 may calculate the dimension of the plane portion of the contact determination area on the basis of the distance between the position of the head of the thumb and the position of the head of the middle finger. Furthermore, the contact determination area setting unit 102 may change the dimension of the plane portion as needed on the basis of the continuously detected position (change of the position) of the finger.

In addition, when calculating the dimension of the plane portion or the height of the edge portion of the contact determination area, the contact determination area setting unit 102 may perform the calculation on the basis of a detectable angle or position of a finger among the plurality of fingers.

In addition, the contact determination area setting unit 102 may set an edge portion in a case where the angles of the fingers, the number of which exceeds a predetermined number (1, 2, 3, or the like), exceed a threshold, and calculate the height of the edge portion on the basis of the angle (the angle of at least one of the fingers). As for the predetermined number, any fingers may be further designated. It is therefore possible to appropriately set the edge portion of the contact determination area in accordance with a more natural shape of the fingers.

6. Summary

As described above, the information processing apparatus according to the embodiment of the present disclosure can more easily implement the interaction between the virtual object and the palm of the user in a natural expression.

The preferred embodiment of the present disclosure has been described in detail above with reference to the accompanying drawings, but the present technology is not limited to such examples. It is obvious that those with ordinary knowledge in the technical field of the present disclosure can conceive various changes or corrections within the scope of the technical idea described in the claims, and it is naturally understood that such changes and corrections also belong to the technical scope of the present disclosure.

For example, the contents of the embodiment, modifications, and additional notes described above are applied to both the left hand and the right hand, and the contact determination area can be set on both the left hand and the right hand.

In addition, it is also possible to create one or more computer programs for causing hardware such as the CPU, the ROM, and the RAM built in the information processing apparatus 10 described above to exhibit a function of the information processing apparatus 10. Furthermore, a computer-readable storage medium storing the one or more computer programs is also provided.

In addition, the effects described in the present specification are merely illustrative or exemplary, and are not restrictive. That is, the technology of the present disclosure can exert other effects obvious to those skilled in the art from the description of the present specification together with or instead of the effects described above.

Note that the present technology can adopt the following configurations.

(1) An information processing apparatus including a controller that displays a virtual object on a display unit, in which
the controller detects a planar area of a hand from a captured image obtained by capturing an image of a real space,
the controller performs control to set a contact determination area for determining contact with the virtual object for the planar area of the hand having been detected, and
the contact determination area includes at least one plane portion.

(2)
The information processing apparatus according (1), in which the contact determination area further includes an edge portion located at an edge of the plane portion.

(3)
The information processing apparatus according to (2), in which the controller calculates a height of the edge portion on the basis of a shape of the hand.

(4)
The information processing apparatus according to (2) or (3), in which the controller changes the height of the edge portion in accordance with a change in a shape of a finger of the hand.

(5)
The information processing apparatus according to (3) or (4), in which the controller calculates the height of the edge portion on the basis of an initial value of the height of the edge portion calculated on the basis of a dimension of the hand or a dimension of the virtual object, and a change in an angle of the finger of the hand.

(6)
The information processing apparatus according to (3) or (4), in which the controller calculates the height of the edge portion on the basis of an angle of one or a plurality of the fingers of the hand detected as the shape of the fingers of the hand.

(7)
The information processing apparatus according to any one of (3) to (6), in which the controller sets the height of the edge portion to 0 in a case where the angle of the finger of the hand falls below a threshold.

(8)
The information processing apparatus according to any one of (2) to (6), in which the controller changes the height of the edge portion in accordance with a change in an angle of a wrist.

(9)
The information processing apparatus according to (8), in which the controller sets the height of the edge portion to 0 in a case where the angle of the wrist exceeds a threshold.

(10)
The information processing apparatus according to (3) or (4), in which the controller calculates the height of the edge portion on the basis of a distance between predetermined positions of the fingers of the hand.

(11)
The information processing apparatus according to any one of (1) to (10), in which the plane portion is set on the planar area of the hand.

(12)
The information processing apparatus according to any one of (1) to (11), in which the controller determines a size of the plane portion on the basis of at least one of the dimension of the hand and the dimension of the virtual object.

(13)
The information processing apparatus according to (12), in which the controller determines the size of the plane portion on the basis of information of a larger one of the dimension of the hand and the dimension of the virtual object.

(14)
The information processing apparatus according to any one of (1) to (13), in which the controller changes the size of the plane portion in accordance with a change in the shape of the hand.

(15) An information processing method including:
displaying, by a processor, a virtual object on a display unit, and
detecting, by the processor, a planar area of a hand from a captured image obtained by capturing an image of a real space, and performing, by the processor, control to set a contact determination area for determining contact with the virtual object for the planar area of the hand having been detected, in which
the contact determination area includes at least one plane portion.

(16) A program that causes a computer to function as a controller that displays a virtual object on a display unit, in which
the controller detects a planar area of a hand from a captured image obtained by capturing an image of a real space,
the controller performs control to set a contact determination area for determining contact with the virtual object for the planar area of the hand having been detected, and
the contact determination area includes at least one plane portion.

REFERENCE SIGNS LIST

10 Information processing apparatus
100 Controller
101 Recognition processor
102 Contact determination area setting unit
103 Display processor
110 Communication unit
120 Camera
130 Operation input unit
140 Sensor unit
150 Display unit
160 Speaker
170 Storage

The invention claimed is:

1. An information processing apparatus comprising:
a controller including circuitry configured to
initiate display of a virtual object on a display unit,
detect a planar area of a hand from a captured image obtained by capturing an image of a real space, and
perform control to set a contact determination area for determining contact with the virtual object for the detected planar area of the hand,
wherein the contact determination area includes at least one plane portion, and
wherein the contact determination area is set based on an angle of at least one finger of a hand.

2. The information processing apparatus according to claim 1,
wherein the contact determination area further includes at least one edge portion located at an edge of the at least one plane portion.

3. The information processing apparatus according to claim 2,
wherein the circuitry is further configured to calculate a height of the at least one edge portion based on a shape of the hand.

4. The information processing apparatus according to claim 3,
wherein the circuit calculates the height of the at least one edge portion based on
an initial value of the height of the at least one edge portion calculated based on a dimension of the hand or a dimension of the virtual object, and
a change in the angle of the at least one finger of the hand.

5. The information processing apparatus according to claim 3,
wherein the circuit calculates the height of the at least one edge portion based on the angle of the at least one finger of the hand detected as the shape of the hand.

6. The information processing apparatus according to claim 3,
wherein the circuitry calculates the height of the at least one edge portion to 0 in a case where the angle of the at least one finger of the hand falls below a threshold.

7. The information processing apparatus according to claim 3,
wherein the controller calculates the height of the at least one edge portion based on a distance between predetermined positions of the at least one finger of the hand.

8. The information processing apparatus according to claim 2,
wherein the circuitry is further configured to change a height of the at least one edge portion in accordance with a change in a shape of the at least one finger of the hand.

9. The information processing apparatus according to claim 2,
wherein the circuitry is further configured to change a height of the at least one edge portion in accordance with a change in an angle of a wrist connected to the hand.

10. The information processing apparatus according to claim 9,
wherein the circuitry changes the height of the at least one edge portion to be 0 in a case where the angle of the wrist exceeds a threshold.

11. The information processing apparatus according to claim 1,
wherein the at least one plane portion is set on the detected planar area of the hand.

12. The information processing apparatus according to claim 1,
wherein the circuitry is further configured to determine a size of the at least one plane portion based on at least one of a dimension of the hand or a dimension of the virtual object.

13. The information processing apparatus according to claim 12,
wherein the circuitry determines the size of the at least one plane portion based on information of a larger one of the dimension of the hand and the dimension of the virtual object.

14. The information processing apparatus according to claim 1,
wherein the circuitry is further configured to change a size of the at least one plane portion in accordance with a change in a shape of the hand.

15. An information processing method comprising:
displaying, by a processor, a virtual object on a display unit;
detecting, by the processor, a planar area of a hand from a captured image obtained by capturing an image of a real space; and
performing, by the processor, control to set a contact determination area for determining contact with the virtual object for the detected planar area of the hand,
wherein the contact determination area includes at least one plane portion, and
wherein the contact determination area is set based on an angle of at least one finger of a hand.

16. A non-transitory computer-readable storage medium having embodied thereon a program, which when executed by a computer causes the computer to execute a method, the method comprising:
displaying a virtual object on a display unit;
detecting a planar area of a hand from a captured image obtained by capturing an image of a real space; and
setting a contact determination area for determining contact with the virtual object for the detected planar area of the hand,
wherein the contact determination area includes at least one plane portion, and
wherein the contact determination area is set based on an angle of at least one finger of a hand.

* * * * *